United States Patent [19]

Yoshida et al.

[11] Patent Number: 5,276,328
[45] Date of Patent: Jan. 4, 1994

[54] RADIATION DETECTOR HAVING REFLECTIVE ISOLATION PLATES

[75] Inventors: Minoru Yoshida, Tokyo; Manabu Nakagawa, Kanagawa; Koichi Koike, Kashiwa, all of Japan

[73] Assignee: Hitachi Medical Corporation, Tokyo, Japan

[21] Appl. No.: 928,260

[22] Filed: Aug. 11, 1992

[30] Foreign Application Priority Data

Aug. 13, 1991 [JP] Japan ............... 3-202717

[51] Int. Cl.$^5$ ................ G01T 1/20
[52] U.S. Cl. ................ 250/368; 250/367; 250/370.11
[58] Field of Search .......... 250/366, 367, 368, 370.11

[56] References Cited

U.S. PATENT DOCUMENTS

| | | | |
|---|---|---|---|
| 4,914,301 | 4/1990 | Akai | 250/370.11 |
| 5,144,141 | 9/1992 | Rougeot et al. | 250/366 |

FOREIGN PATENT DOCUMENTS

58-219471 12/1982 Japan .
1-202684 8/1989 Japan .

Primary Examiner—Carolyn E. Fields
Attorney, Agent, or Firm—Antonelli, Terry Stout & Kraus

[57] ABSTRACT

A multi-elements radiation detector provides isolation plates each having a uniform light reflectance on the surface, excellent reproducibility and uniform performance for enhancing an X-ray spatial efficiency and a light transmission efficiency and is intended to improve a detection efficiency and an S/N of a reconstructed image so that the detector may be used for a digital X-ray imaging system, in particular, an X-ray computed tomography system. In the multi-elements radiation detector, each isolation plate isolating the adjacent elements from each other includes a thin plate made of Mo. On the surfaces of the thin plate, there are provided organopolysiloxane membranes obtained by hydrolyzing and condensing organosilicate such as $CH_3Si(OCH_3)_3$ so that those surfaces are formed to be specular-reflective. On the films, there are formed reflective multi optical thin films composed of a combination of Al, $MgF_2$ and $TiO_3$. The isolation plate uses Mo as its material for improving its X-ray spatial efficiency. Further, the light reflectance on the surface is made as high as 85%, so that the light absorption is reduced on the surface of the isolation plate, thereby improving a light transmission efficiency and a detection efficiency. This leads to improving an S/N of an image reconstructed by an X-ray computed tomograpy system.

30 Claims, 2 Drawing Sheets

RADIATION DETECTOR HAVING REFLECTIVE ISOLATION PLATES

BACKGROUND OF THE INVENTION

The present invention relates to a digital X-ray imaging system and more particularly to an X-ray computed tomography system for medical use and a multi-elements solid-state radiation detector used for an X-ray scanography system, a bone mineral densitometer, a baggage inspection system, and the like.

In recent days, the needs have being risen for improving the quality of an image displayed in a digital X-ray imaging system, in particular, an X-ray computed tomography system used for an X-ray computed tomography for medical use, an X-ray scanography system, a bone mineral densitometer or a baggage inspection system. To improve the quality of an image, it is indispensable to enhance the performance of an X-ray detector served as a key component of such, a device. Today, the main stream of the X-ray detector is an xenon ionization detector, the performance of which has been improved up to a limit in light of the operating principle and structure. In practice, therefore, it is quite difficult to enhance the density and the sensitivity of the xenon ionization detector. As such, in place of the xenon ionization detector, today, a high-performance multi-elements solid-state radiation detector has been proposed. This detector is arranged to have a plurality of X-ray detection elements, each of which is composed of a scintillator and a photodiode served as a photoelectric conversion element. Remarks have been focused on this detector in that it can provide a more excellent S/N of an image than the ionization detector. FIG. 2 shows one example of a fundamental structure of a multi-elements solid-state radiation detector to which the present invention relates. The radiation detector is comprised of a scintillator 2 for converting X-ray 6 incident to the detector into light, a photodiode 3 for converting the light into an electric signal, an isolation plate 1 for isolating the adjacent X-ray detection elements from each other, a reflective plate at front window 5 for transmitting incident X-ray, cutting off light incoming from the outside of the detector, reflecting the light applied from the scintillator 2 and guiding the reflected light into a photodiode 3, and a print circuit board 4. The performance of the detector is evaluated by its quantum efficiency. To enhance the quantum efficiency, it is important to enhance the light collection efficiency of the scintillator 2, the photoelectric conversion efficiency of the photodiode 3, the X-ray spatial efficiency of the detector, and the light transmission efficiency inside of the detector.

To enhance the X-ray spatial efficiency, it is necessary to reduce a ratio of dead space to overall space on the detector, that is, an area except the scintillator 2 in which no contribution is made to detecting an incident X-ray, concretely, the isolation plate 1 for isolating the adjacent elements from each other as shown in FIG. 2. To enhance the light transmission efficiency, it is important to reduce absorption of light inside of the scintillator 2 and on the surface of the isolation plate 1 and the reflective plate at front window for the purpose of efficiently guiding light to the photodiode 3.

The spatial resolution on a reconstructed image formed by the X-ray computed tomography depends on a width of an X-ray detection element of the detector (a spacing between the isolation plates in FIG. 2). Today, many of X-ray computed tomography systems have a width which is as narrow as 1 mm or less for improving the spatial resolution. A narrower width of an X-ray detection element results in making radiation dose incident to each detection element smaller, thereby reducing an output signal of the detection element according to the radiation dose, and lowering its S/N. To keep lowering of the S/N to a minimum, various results are required to be achieved.

As the width of the X-ray detection element is made narrower, the quantity of light applied from the scintillator 2 directly to the photodiode 3 is made smaller. As the light is travelling to the photodiode 3 through a light path, the light is reflected on the surface of the isolation plate 1 and the surface of the reflective plate at front window 5 in various directions and is refracted lot of times within the scintillator 2. As such, it is impossible to keep a reflectance on the surface of the reflective plate at front window 5 and the isolation plate 1 to 100%. Each reflection entails light absorption, so that the detection efficiency may be inevitably lowered. In a case that, therefore, the reflectance on the surface is made lower, the absorptive quantity of light is increased so that the detection efficiency is made lower accordingly. It is therefore necessary to enhance the reflectance on the surface of the reflective plate at the front window and the isolation plate.

Consider that the surfaces of the reflective plate at the front window 5 and the isolation plate 1 have fine concaves and convexes and serve as diffusible reflectors. On the diffusible reflector, the reflected light is scattered so that it may be expanded in the light path. This results in increasing the number of reflections on the surface, thereby lowering the detection efficiency. Hence, it is preferable that the isolation plate 1 has so smooth a surface that it may be specular-reflective. However, it is quite difficult to obtain direct reflection on the surface of the isolation plate 1. It means that the performance of the isolation plate 1, that is, the performance of the detector depends on how much its surface comes closer to specular reflection.

As prior art for enhancing an X-ray spatial efficiency and a light transmission efficiency, proposals have been made in JP-A-1-202684 and JP-A-58-219471. In the former proposal, for obtaining the isolation plate 1, a metallic thin film made of Ta, W or Wo is chemical etched to a predetermined form. A different metal from that of the isolation plate, such as Cu, Ni or Cr is plated on the etched metal film and is made mechanically smoother. On the resulting film, there is formed a light reflective film for improving a reflectance of the surface. In the latter proposal, a reflective isolation plate is formed by filling a mixture of a light reflective agent (barium sulfate, titanium dioxide, etc.) and an adhesive agent between the adjacent X-ray detection elements.

SUMMARY OF THE INVENTION

Of the prior art for enhancing a quantum efficiency, in the prior art disclosed in JP-A-1-202684, to achieve sufficient isolation of radiation between the adjacent elements if the isolation plate is thin, the metal having a great atomic number, such as Ta, W or Wo is used as a material of the isolation plate. To enhance the light transmission efficiency, glossy nickel-plating is applied on the surface of the isolation plate. However, for plating the metal such as Ta, W or Mo, a special plating method or technique is required. The glossy nickel-plating cannot provide sufficient gloss on the surface. For obtaining sufficient gloss, it is necessary to make the plating layer sufficiently thick and finish the direct-reflective surface by a buff polishing technique. To make the plating layer thick (as thick as 20 to 50 μm) for obtaining finishing allowance for polishing, the dead space is increased, so that the X-ray spatial efficiency may be made lower accordingly and cracks or stripping mediums for coatings are more likely to take place. Further, the buff polishing process has difficult in automation and mainly relies on manual operations. Hence, some skill is needed for obtaining a polished surface keeping a proper reproducibility and constant conditions. This results in making the productivity worse, thereby lowering the yield and enhancing the cost of products. An unstable state on the polished surface is a cause of variable reflectances. Hence, each element of the detector provides variable outputs and variable characteristics of sensitivity for a change of X-ray energy spectrum. In a three generation system X-ray computed tomography system, those variable characteristics provided by a multi-elements solid-state radiation detector are a great cause to occurrence of an artificial circular image (ring artifact).

In the other prior art for enhancing light transmission efficiency, that is, in JP-A-58-219471, a mixture of barium sulfate powder and an adhesive agent is used for an isolation wall. In this case, the barium sulfate powder has a light reflectance which is as high as 90% or more. However, since the powder is used, the resulting isolation wall has a low density. To obtain sufficient reflection characteristics and a high light transmission efficiency and prevent leakage of light to an adjacent element, the thickness of the isolation wall has to be as long as 0.5 mm to 3 mm, though the thickness depends on the magnitude of a density of the barium sulfate powder filled in the adhesive agent. Hence, the multi-elements radiation detector employing this prior art has a far worse X-ray spatial efficiency. Moreover, it is necessary to take into consideration the degrade of the reflection characteristics accompanied with the coloring degrade of the adhesive agent due to X-ray radiation. As described above, the conventional techniques do not take into sufficient consideration the improvement of quantum efficiency and thus have difficulty in providing an isolation plate or isolation wall having excellent performance.

It is an object of the present invention to provide a multi-elements solid-state radiation detector which provides an isolation plate having uniform light reflectance, excellent reproducibility and constant performance for enhancing an X-ray spatial efficiency and a light transmission efficiency, which is comprised of a scintillator and a photodiode for enhancing a detection efficiency and an S/N of a reconstructed image, and which has superior characteristics enabling its use as a digital X-ray imaging system.

In carrying out the object, a thin tabular member such as Ta, W, Mo, Au, Pb, Fe or Cu is used as a material of the isolation plate. The tabular member is worked to a predetermined form. Then, on the worked member, there is formed a membrane having as a main component organopolysiloxane obtained by hydrolyzing and condensing organosilicate. The surface of the membrane is made so smooth that it may have specular reflection. On the surface of the organopolysiloxane membrane composed of organo polysiloxane as a main body and formed to be direct-reflective, a reflective multi optical thin film is formed of combinations of Al, Au, Ag and $SiO_2$, $MgF_2$, $TiO_2$ by an evaporating technique for the purpose of enhancing a light reflectance.

To prevent leakage of radiation between the adjacent elements provided in the multi-elements detector, a plate formed of Ta, W, Mo, Au, Pb, Fe or Cu is used as a material of the isolation plate. The reflective multi optical thin film is formed on the isolation plate. Hence, the thickness of the isolation plate is made so thick that the X-ray spatial efficiency can be improved.

By providing on the surface of the plate the organopolysiloxane membrane as a main body, the organopolysiloxane obtained by hydrolyzing and condensing organo silicate, the concaves and convexes on the surface of the plate are buried so that the surface may be made so smooth as being specular-reflective. The organopolysiloxane membrane can be formed to be as thin as 1 to 5 μm and to have excellent and smooth specular reflection. Hence, on this surface, the light diffusion is reduced so that the light transmission efficiency may be improved. Further, the reflective multi optical thin film is provided for enhancing a light reflectance on the surface more. This results in reducing the light absorption on the surface of the isolation plate, thereby improving the light transmission efficiency thereon.

As mentioned above, the radiation detector according to this invention provides a more excellent quantum efficiency and output than the conventional radiation detector and reduces the variety of characteristics of the elements.

DESCRIPTION OF THE PREFERRED EMBODIMENTS

Figure 2:
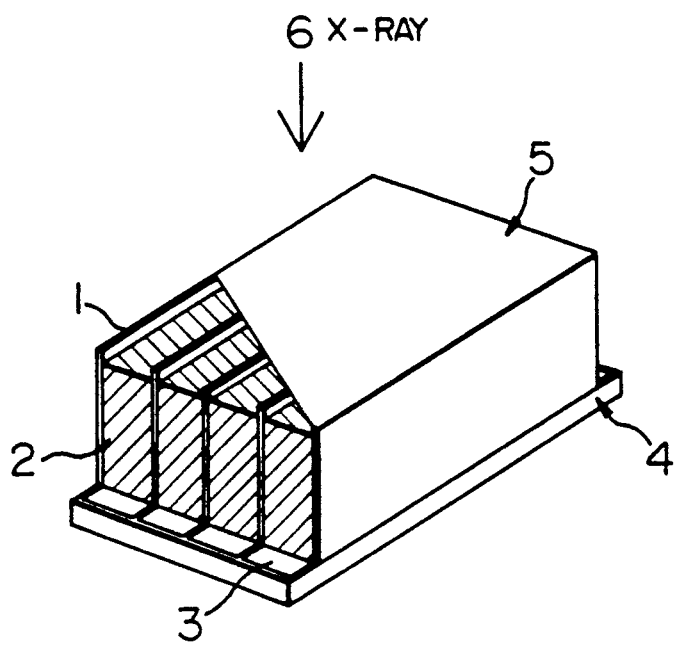
FIG. 2 is a perspective view showing one example of a basic structure of a multi-elements solid-state radiation detector.

FIG. 2 shows a basic structure of a multi-elements solid-state radiation detector, which is comprised of an isolation plate 1, a scintillator 2, a photodiode 3, a print circuit board 4, and a reflective plate at front window 5.

The narrower width of an X-ray detection element in this type of detector reduces a quantity of light to be applied from the scintillator directly to the photodiode 3. That is, in a light path, the most quantity of light is reflected on the surfaces of the isolation plate 1 and the reflective plate at front window 5 in various directions and in the scintillator 2 the light is refracted many times until the light arrives the photodiode 3. It is impossible to raise the surface reflectances of these surfaces up to 100%. At each reflection, the light absorption inevitably takes place. This results in lowering the detection efficiency. As such, if the isolation plate 1 and the reflective plate at front window 5 has a low reflectance on the surfaces, the quantity of light absorption is increased, so that the detection efficiency is made lower accordingly. To overcome such a shortcoming, it is necessary to enhance the surface reflectance.

In a case that the reflective plate at front window 5 and the isolation plate 1 have fine concaves and convexes on their surfaces, that is, they serve as diffusible reflectors, the reflected light is scattered within the light path. This results in make the number of reflections greater, thereby lowering the detection efficiency of light accordingly. Hence, it is preferable that these surfaces should be specular-reflective. However, it is quite difficult to obtain a direct-reflective surface. Hence, how the surfaces come closer to specular reflection is a problem to be solved. This influences the performance of the isolation plate, that is, the performance of the detector.

Figure 3:
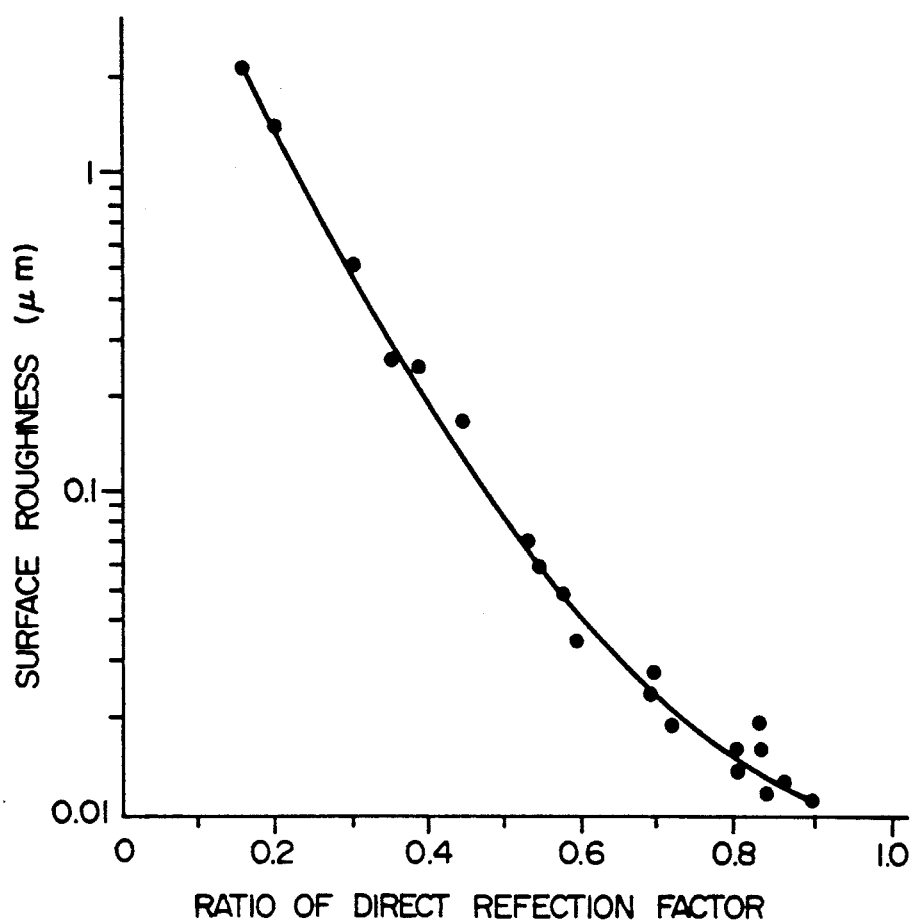
FIG. 3 is a graph showing a relation between a surface roughness and a direct reflection factor of a metal plate obtained by an experiment.

FIG. 3 shows a ratio of light components reflected in the specular-reflective direction to light components scattered in any other direction except that direction, that is, a ratio of a direct reflection factor obtained by an experiment, assuming that the surface roughness of a metal plate is changed stepwise and the light is applied onto the surface at an incident angle of 40°.

The experiment has proven that if a ratio of the direct reflection factor is about 70% or more, the detection element keeps a constant sensitivity. As is apparent from FIG. 3, therefore, it has been proven that the surface roughness is made to be $Ra=0.03$ μm or less.

Figure 1:
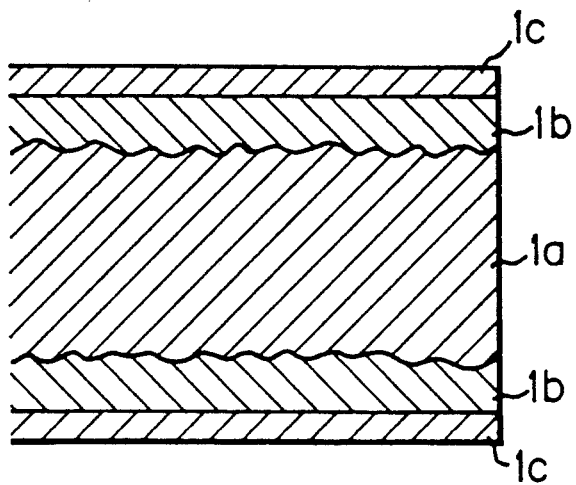
FIG. 1 is a sectional view showing an isolation plate according to an embodiment of the present invention.

In turn, the description will be directed to one embodiment of this invention as referring to FIG. 1, which shows an isolation plate included in this embodiment in detail. This isolation plate uses as a material a thin plate 1a of Mo (whose thickness is about 100 μm) for the purpose of enhancing a X-ray spatial efficiency and keeping a leakage of radiation to each adjacent element to a minimum. This is because the thin plate of Mo has a property of absorbing the largest quality of radiation in any other thin plate. That is, the material of Mo provides a high absorption factor, a relatively high workability and a high mechanical rigidity. This is why Mo is suitable to the material of the isolation plate. As another material, it is possible to use a metal plate made of a material having a high absorption coefficient of radiation such as Ta, W, Au, Pb, Fe or Cu, cladding materials made of these materials, or a thin metal plate (50 to 300 μm) made of alloy formed of any one of Ta, W, Au, Pb, Mo, Fe or Cu as a main component.

Figure 4:
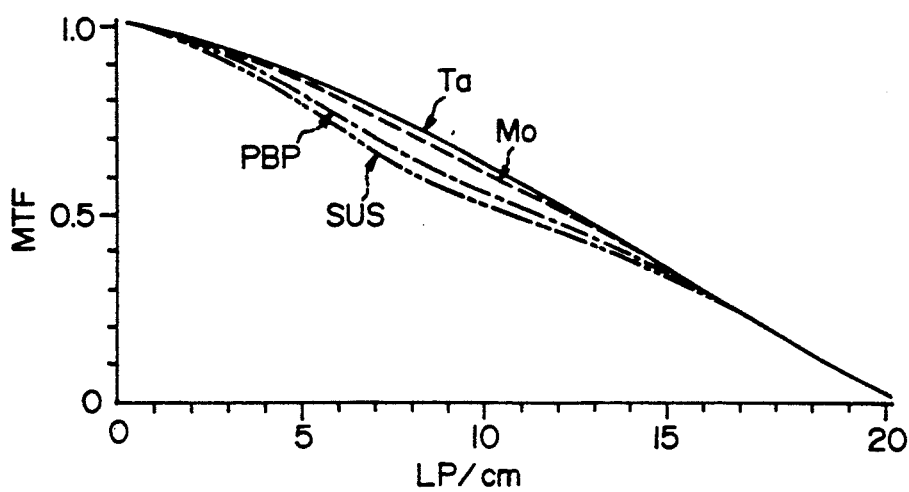
FIG. 4 is a graph showing a change of MTF (Modulation Transfer Function) characteristics as varying a material of an isolation plate.

FIG. 4 shows each change of a MTF (Modulation Transfer Function) standing for a spatial resolution property in a case that the material of the isolation plate 1 in the X-ray computed tomography system is sequentially changed to Ta, Mo, PBP (phosphor bronze plate), SUS (stainless steel) of 100-μm thickness. The change is computed through the effect of a computer simulation considering a leakage of X-ray to each adjacent element. This computing process ignores the effect of an X-ray focus size. As is obvious from FIG. 4, the computation has proven that the MTF property is made more excellent in the order of SUS, PBP, Mo and Ta. This is due to the difference of an X-ray absorption coefficient between the materials used for forming the isolation plate. Concretely, as the X-ray absorption coefficient is made larger, the X-ray leaked to each adjacent element becomes smaller. Further, by comparing images reconstructed by the detector of the Mo-based isolation plate and that of the SUS-based isolation plate, it has been proven that the detector using the isolation plate of Mo is a bit more excellent than the detector using the isolation plate of SUS. To manufacture a radiation detector at a lower cost, as described above, it is possible to use Cu, an alloy having Cu as a main component such as phosphor bronze or brass, or another alloy having Fe or stainless as a main component, which are made more commercially available and can be more easily worked, though the radiation detector using the isolation plate of each of those materials may reproduce a less clear image than the radiation detector using the isolation plate of Ta or Mo. The detector using the isolation plate of the material Cu, Cu-based alloy, or Fe-based alloy can be endurable to that of an X-ray computed tomography system for medical use. On the other hand, though Ta has a higher absorption coefficient than Mo, Mo is more practical in light of the cost and the workability.

Next, a manufacturing process of the isolation plate included in this embodiment will be roughly described. At first, the thin plate 1a made of Mo is worked to have a necessary dimensional form as the isolation plate. As a working method, it is possible to apply punch press machining with a metallic mold, ultrasonic machining, laser machining, electric discharge machining, electron beam machining, plasma jet machining or chemical etching. In this embodiment, a chemical etching method is used for the purpose of enhancing the efficiency of manufacturing an isolation plate and the dimensional accuracy of a worked plate. This is because the chemical etching method has a property of lessening bowing, bending and blur in working the plate and being capable of working a plurality of plates at a time. The chemical etching method makes it possible to form serial patterns of isolation plates connected by tabs on the thin plate of Mo (whose thickness is about 100 μm) having a dimension of about 12 cmm×25 cmm, each isolation plate being formed to have a dimension of about 1.5 mm×30 nm.

The thin plate 1a of Mo worked as a predetermined form is required to form both of the surfaces to be specular-reflective with a surface roughness of $Ra=0.03$ μm. For this purpose, On the thin plate 1a, there is provided a membrane 1b made of organo polysiloxane (thin film: 1 to 5 μm) having a siloxane bond. The siloxane bond is formed by hydrolyzing and condensing a material selected from organo silicates represented by a general formula of $RnSi(OR')m$, where $m=4-n$, $n=0, 1, 2, 3$, $R=H$, Cl, Br, $CH_3$, $C_2H_5$, $R'=$ an alkyl group having any one of one to ten carbons.

For forming this type of organopolysiloxane membrane, in general, a material of tetrafunctional orthoalkylsilicate, for example, $Si(OCH_3)_4$ or $Si(OC_2H_5)_4$ is most frequently used. The material used next to that is a material of trifunctional $CH_3Si(OCH_3)_3$ or $CH_3Si(OC_2H_5)_3$. The tetrafunctional orthoalkylsilicate can provide a membrane whose surface has the highest hardness. The trifunctional orthoalkylsilicate can provide a membrane whose surface has a lower hardness but repels water well because a $CH_3$ group exists on the surface of the film. Further, the latter membrane provides a high shock durability on the surface. The membrane formed of tetrafunctional orthoalkylsilicate is often made as thin as 1 μm or less and the membrane formed of trifunctional orthoalkylsilicate is often made as thick as 1 to 3 μm, though these thicknesses are variable according to a density of a used solution and a coating method. According to this embodiment, as mentioned above, the thin plate 1a of Mo is worked by the chemical etching method. To enhance the bonding strength of resist in a process of coating the resist while working the plate, the surface of the Mo-made plate is worked to be rough (Rmax: about 1 μm). To completely bury concaves and convexes on the surface, therefore, it is more effective to use the trifunctional orthoalkylsilicate.

In this embodiment, the organopolysiloxane membrane is formed by hydrolyzing a material of methyltrimethoxysilane of alkoxysilane system of a trifunctional structural unit, $CH_3Si(OCH_3)_3$ with a solvent (for example, ethanol, isopropanol, ethyl cellosolve, isobuthanol, ethylene glycol) and hydrolyzing and condensing the hydrolyzed material with $SiO_2$ whose average grain size is 15 to 20 nmf for generating organopolysiloxane. The material of $SiO_2$ serves as an oligomer of high condensed product and is mixed for making the thickness of the resulting membrane wider. As such, the resulting thin film employs a multi-dimensional bridge structure. The process of generating an organopolysiloxane membrane is so simple: dipping the worked film 1a of Mo in a mixed solution of the oligomer, carbithol, and an organic solvent such as buthyl alcohol, taking the plate 1a out of the mixed solution, coating the mixed solution on both surfaces of the plate 1a, and heating the plate 1a at 150° to 200° C. for 5 to 120 minutes (dip coating method). As another coating method, a spray coating method or a roller coating method has been proposed. In light of the cost and the smoothness on the coated surface of the plate 1a, the dip coating method is the most appropriate. The thickness of the formed organopolysiloxane membrane is made as thick as 2 to 5 μm through the effect of mixing with $SiO_2$. The surface of the resulting membrane has a surface roughness of Ra=0.03, that is, it serves as a specular reflector. Further, as stated above, the surface of the film provides a relatively high shock durability and serves to repel water well since $CH_3$ group exists on the surface of the membrane. Hence, the complete isolation plate can be easily handled. The organopolysiloxane membrane provides a higher radiation durability than any other membrane made of polymer molecular resin. Concretely, the membrane does not vary its mechanical strength and thus is not degraded if it is subject to radiation of about two million.

As another material, it is possible to use a copolymer made of organopolysiloxane and alkyd resin or a copolymer made of organopolysiloxane and multifunctional acrylic system resin. However, the membrane made of organosilicate only is a bit superior in radiation durability. In any case, if the membrane is formed of organo polysiloxane as a main component, the film may be a levelled surface with the concaves and convexes on the surface of the isolation plate being buried.

Further, a reflective multi optical thin film 1c is formed on both surfaces of the organopolysiloxane membrane serving as a specular reflector by means of a vacuum evaporation technique. The optical thin film 1c is formed by combining Al (about 1000 Å), $MgF_2$ (about 900 Å) and $TiO_2$ (about 600 Å). The light reflectance of this optical thin film is so high as 85% or higher in the wavelength range of 400 to 780 nm (the light reflectance of the scintillator used in this embodiment is 95% at a peak wavelength of 540 nm). As such a reflective multi optical thin film, it is possible to selectively use a single optical thin film of Al or Ag formed by a vacuum evaporation, a sputtering, an ion implantation techniques or a reflective multi optical thin film made of a combination of Al and $SiO_2$, a combination of Au and $SiO_2$, a combination of Ag and $SiO_2$, a combination of Au, $MgF_2$ and $TiO_2$, and a combination of Ag, $MgF_2$ and $TiO_2$ according to an emission spectrum of the used scintillator.

With the foregoing process, the uniform and equally-characterized isolation plates can be manufactured at a lower cost and without any skill.

Further, according to this embodiment, the reflective plate at front window 5 is a thin plate made of Al or resin and serves to cut off the light incident from the outside of the detector, efficiently transmit incident X-ray, and absorb less radiation. The reflective multi optical thin film is provided on the inner surface of the reflective plate at front window 5 directed toward the scintillator. This results in improving the light reflectance and light transmission efficiency of the detector.

According to the foregoing embodiment, the isolation plate uses Mo as its material and the thickness of the plate is made as thin as about 100 μm for the purpose of improving X-ray spatial efficiency.

The very thin (1 to 5 μm) membrane made of organo silicate is formed on the surface of the isolation plate. Hence, the isolation plate serves as a specular reflector (Ra=0.03 μm or less) on a rough surface without having to do a special work such as abrasion on the surface.

The isolation plate provides the reflective multi optical thin film formed on the organopolysiloxane membrane. This makes contribution to improving X-ray spatial efficiency (which is higher by 8 to 10% than the conventional plated film and is about 2.5 times as high as a barium sulfate diffused reflective film). Since the surface is specular-reflective (Ra=0.03 μm or less), the diffused factor of light is decreased on the surface of the, isolation plate and the direct reflection factor of the light is increased, for the purpose of improving the light transmission efficiency.

The reflective multi optical thin film formed on each surface of the organopolysiloxane membrane serves to increase the light reflectance on the surface by 85% or more (95% in a peak wavelength of 540 nm). Further, the isolation plate reduces its light absorption on the surface, thereby improving the light transmission efficiency. For example, consider the comparison between a detector having an isolation wall having a barium sulfate diffused surface whose direct reflectance is the substantially same value of 92% and the detector of this invention in light of performance, the detector of this invention can provide provides about 2.5 times as high a X-ray spatial efficiency as and a higher output by 5 to 8% than the former detector.

As compared to any other organic polymer molecular resin film, the membrane made of organo polysiloxane is higher in radiation durability, so that the film is not variable in mechanical strength if it is subject to radiation of about 2 million R.

With the process of this embodiment, as described above, the film made of organopolysiloxane can be more easily formed as compared to the electric plating or the working on the surface of the film used in the conventional techniques. That is, this process does not need any skill and so high a cost.

As set forth above, the radiation detector according to this invention provides a superior quantum efficiency and output than the conventional detector and less variable characteristics of the composing elements.

What is claimed is:

1. In a multi-elements solid-state radiation detector having a plurality of arranged detecting elements each having a scintillator for converting X-rays into light and a photodiode for converting light into an electric signal and a plurality of metallic isolation plates located between adjacent detecting elements for isolating said elements from each other, said radiation detector comprising:
- a membrane comprising organopolysiloxane as a main component formed on both surfaces of each of said isolating plates and a reflective multi-optical film formed on said membrane for enhancing a light reflectance.

2. A radiation detector as claimed in claim 1, wherein said membrane comprises organopolysiloxane having a siloxane bond formed by hydrolyzing and condensing organosilicate represented by a general formula of $R_nSi(OR')_m$, wherein n is any one of 0, 1, 2 and 3, m is 4-n, R is any one of H, Cl, Br, $CH_3$ and $C_2H_5$, and R' is alkyl group having from 1 to 10 carbon atoms.

3. A radiation detector as claimed in claim 1, wherein said membrane comprises organopolysiloxane having a siloxane bond formed by hydrolyzing and condensing $CH_3SI(OCH_3)_3$ or $CH_3Si(OC_2H_5)_3$.

4. A radiation detector as claimed in claim 1, wherein said membrane comprises organopolysiloxane having a siloxane bond formed by hydrolyzing and condensing $Si(OCH_3)_4$ or $Si(OC_2H_5)_4$.

5. A radiation detector as claimed in claim 1, wherein said film has a surface roughness of $Ra=0.03$ μm or less and is specular-reflective.

6. A radiation detector as claimed in claim 1, wherein the thickness of each of said isolation plates is 100 μm or less.

7. A radiation detector as claimed in claim 1, wherein any one of Ta, W, Mo, Au, Pb, Fe and Cu comprises a material of each of said isolation plates.

8. A radiation detector as claimed in claim 1, wherein an alloy formed of any one of Ta, W, Mo, Au, Pb, Fe and Cu as a main component comprises a material of each of said isolation plates.

9. A radiation detector as claimed in claim 1, wherein said reflective multi optical film comprises a multi-layer film consisting of $SiO_2$ and any one of Al, Au and Ag.

10. A radiation detector as claimed in claim 1, wherein said reflective multi optical film composes a multi-layer film consisting of $MgF_2$, $TiO_2$ and any one of Al, Au and Ag.

11. In a multi-elements solid-state radiation detector having a plurality of arranged detecting elements each having a scintillator for converting X-rays into light and a photodiode for converting light into an electric signal and a plurality of metallic isolation plates located between adjacent detecting elements for isolating said elements from each other, said radiation detector comprising:
- an organopolysiloxane membrane formed on both surfaces of each of said isolation plates, said membrane having a siloxane bond formed by hydrolyzing and condensing $CH_3Si(OCH_3)_3$ or $CH_3Si(OC_2H_5)_3$, having a surface roughness of $Ra=0.03$ μm or less and being specular-reflective; and
- a reflective multi-optical film formed on said membrane for enhancing a light reflectance.

12. A radiation detector as claimed in claim 11, wherein the thickness of each of said isolation plates is 100 μm or less.

13. A radiation detector as claimed in claim 11, wherein any one of Ta, W, Mo, Au, Pb, Fe and Cu comprises a material of each of said isolation plates.

14. A radiation detector as claimed in claim 11, wherein an alloy formed of any one of Ta, W, Mo, Au, Pb, Fe and Cu as a main component comprises a material of each of said isolation plates.

15. A radiation detector as claimed in claim 11, wherein said reflective multi optical film comprises a multi-layer film consisting of $SiO_2$ and any one of Al, Au and Ag.

16. A radiation detector as claimed in claim 11, wherein said reflective multi optical film comprises a multi-layer film consisting of $MgF_2$, $TiO_2$ and any one of Al, Au and Ag.

17. In a multi-elements solid-state radiation detector having a plurality of arranged detecting elements each having a scintillator for converting X-rays into light and a photodiode for converting light into an electric signal and a plurality of metallic isolation plates located between adjacent detecting elements for isolating said elements from each other, said radiation detector comprising:
- an organopolysiloxane membrane formed on both surfaces of each of said isolation plates, said membrane having a siloxane bond formed by hydrolyzing and condensing $Si(OCH_3)_4$ or $Si(OC_2H_5)_4$, having a surface roughness of $Ra=0.03$ μm or less and being specular-reflective; and
- a reflective multi-optical film formed on said membrane for enhancing a light reflectance.

18. A radiation detector as claimed in claim 17, wherein the thickness of each of said isolation plates is 100 μm or less.

19. A radiation detector as claimed in claim 17, wherein any one of Ta, W, Mo, Au, Pb, Fe and Cu comprises a material of each of said isolation plates.

20. A radiation detector as claimed in claim 17, wherein an alloy formed of any one of Ta, W, Mo, Au, Pb, Fe and Cu as a main component comprises a material of each of said isolation plates.

21. A radiation detector as claimed in claim 17, wherein said reflective multi-optical film comprises a multi-layer film consisting of $SiO_2$ and any one of Al, Au and Ag.

22. A radiation detector as claimed in claim 17, wherein said reflective multi optical film comprises a multi-layer film consisting of $MgF_2$, $TiO_2$ and any one of Al, Au and Ag.

23. In a multi-elements solid-state radiation detector having a plurality of arranged detecting elements each having a scintillator for converting X-rays into light and a photodiode for converting light into an electric signal and a plurality of metallic isolation plates located between adjacent detecting elements for isolating said elements from each other, said radiation detector comprising:
- an organopolysiloxane membrane formed on both surfaces of each of said isolation plates, said membrane having a siloxane bond formed by hydrolyzing and condensing $CH_3Si(OCH_3)_3$ or $CH_3Si(OC_2H_5)_3$, having a surface roughness of $Ra=0.03$ μm or less and being specular-reflective; and
- a reflective multi-optical film formed on said membrane for enhancing a light reflectance, said film comprising a multi-layer film of a combination of Al, $MgF_2$ and $TiO_2$.

24. A radiation detector as claimed in claim 23, wherein the thickness of each of said isolation plates is 100 μm or less.

25. A radiation detector as claimed in claim 23, wherein any one of Ta, W, Mo, Au, Pb, Fe and Cu comprises a material of each of said isolation plates.

26. A radiation detector as claimed in claim 23, wherein an alloy formed of any one of Ta, W, Mo, Au, Pb, Fe and Cu as a main component comprises a material of each of said isolation plates.

27. In a multi-elements solid-state radiation detector having a plurality of arranged detecting elements each having a scintillator for converting X-rays into light and a photodiode for converting light into an electric signal and a plurality of metallic isolation plates located between adjacent detecting elements for isolating said elements from each other, said radiation detector comprising:

an organopolysiloxane membrane formed on both surfaces of each of said isolation plates, said membrane having a siloxane bond formed by hydrolyzing and condensing $Si(OCH_3)_4$ or $Si(OC_2H_5)_4$, having a surface roughness of $Ra = 0.03$ $\mu m$ or less and being specular-reflective; and a reflective multi-optical film formed on said membrane for enhancing a light reflectance, said film comprising a multi-layer film of a combination of Al, $MgF_2$ and $TiO_2$.

28. A radiation detector as claimed in claim 27, wherein the thickness of each of said isolation plates is 100 $\mu m$ or less.

29. A radiation detector as claimed in claim 27, wherein any one of Ta, W, Mo, Au, Pb, Fe and Cu comprises a material of each of said isolation plates.

30. A radiation detector as claimed in claim 27, wherein an alloy formed of any one of Ta, W, Mo, Au, Pb, Fe and Cu as a main component comprises a material of each of said isolation plates.

* * * * *